May 11, 1926.
R. M. WARNER
1,584,413
METHOD OF MAKING ACIDPROOF CONTAINERS
Original Filed July 14, 1925
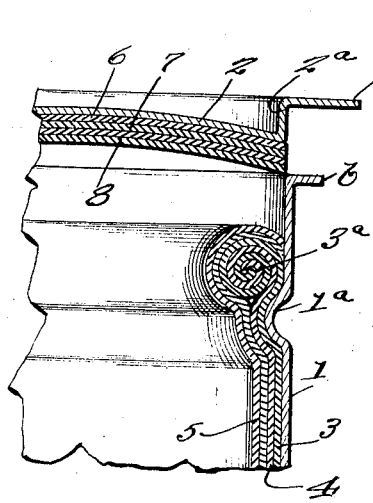
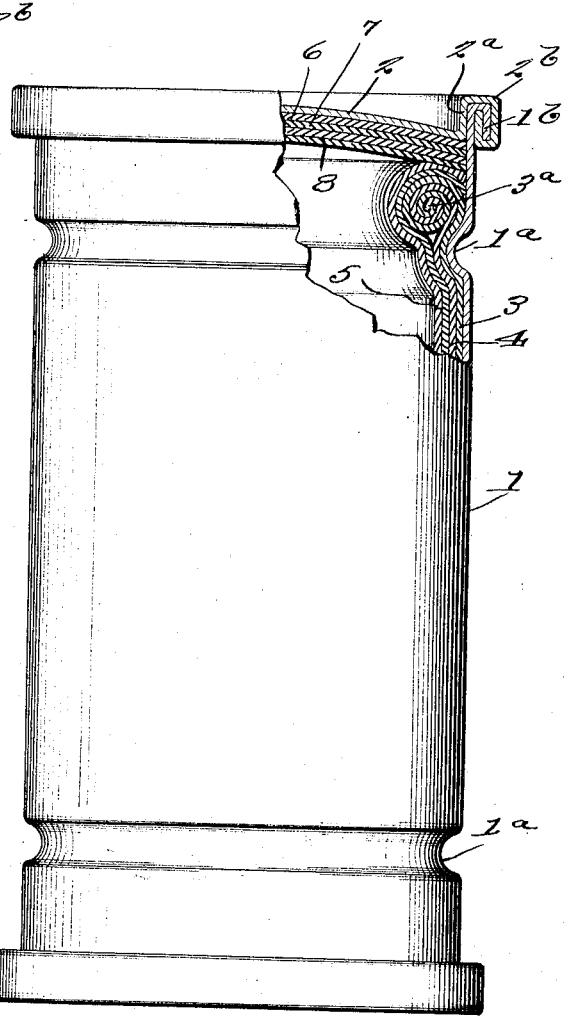
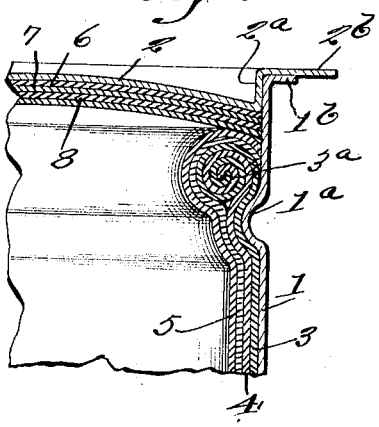
Inventor
Raymond M. Warner
By Spear Middleton Donaldson & Hall
Attorney

Patented May 11, 1926.

1,584,413

UNITED STATES PATENT OFFICE.

RAYMOND M. WARNER, OF AKRON, OHIO, ASSIGNOR TO THE MILLER RUBBER COMPANY, OF AKRON, OHIO, A CORPORATION OF OHIO.

METHOD OF MAKING ACID-PROOF CONTAINERS.

Original application filed July 14, 1925, Serial No. 43,528. Divided and this application filed January 8, 1926. Serial No. 80,056.

This application is a division of an application filed by me in the United States Patent Office on the 14th day of July, 1925, Serial No. 43,528.

The present invention aims to provide a simple and economical method for manufacturing a container for acids, comprising a metal drum having a rubber lining secured thereto in such a manner that it will be prevented from sagging away from the walls of the drum, and the invention includes the novel method hereinafter described and defined by the appended claims.

In order that the invention may be better understood, reference is made to the accompanying drawing, in which:—

Figure 1 is a sectional view of a container at one stage of the manufacture.

Fig. 2 is a similar view at another stage, and

Fig. 3 is a similar view of the completed drum or container.

In proceeding according to my invention, I provide a cylindrical sheet metal drum body 1 open at both ends and provided adjacent to, but spaced from its ends with internal annular shoulders $1^a$ which may be conveniently formed by rolling channels in the exterior surface of the drum, or in an analogous manner. The ends are preferably provided with outwardly turned flanges $1^b$ designed for head securing purposes, as hereinafter described.

The heads are indicated at 2 and are provided with cylindrical portions $2^a$ designed to fit within the ends of the body portion and with outwardly turned flanges $2^b$ designed to cooperate with the flanges $1^b$.

Given such a container body and heads in their unassembled condition, the interior surfaces are thoroughly cleaned, preferably by sand blasting, whereon they may be given a coat of rubber cement which is vulcanized thereon in a suitable manner, as by means of sulphur chloride. Thereafter I apply to the interior surface of the drum body one or more layers of vulcanizable compound, preferably using two layers, indicated respectively at 3 and 4, and in the event that two layers are used, the inner of these layers 4, is preferably formed of a compound which will only partially cure at the temperature which is required to completely cure the layer 3. This lining layer or layers, of vulcanizable rubber, extends sufficiently beyond the shoulders $1^a$ to enable the projecting portion to be rolled upon itself in the form of, or to produce beads which overlie and are juxtaposed to the shoulders $1^a$, such beads being indicated at $3^a$. Thereafter I apply to the inner surface of the lining layer or layers, a lining of unvulcanizable rubber compound indicated at 5, which is preferably of laminated form, that is, composed of two superposed sheets of unvulcanizable material, that is, material which will remain unvulcanized when subjected to the temperature which completely vulcanizes the layer 3 and partially vulcanizes the layer 4.

The unvulcanizable lining is carried up around and over the outer surfaces of the beads as shown. In a similar manner the heads are lined with vulcanizable and unvulcanizable layers, preferably in the same manner, to wit, a completely vulcanizable head layer 6, a partially vulcanizable juxtaposed layer 7, and a laminated unvulcanizable layer 8.

After the lining layers have been applied as above described, the container parts are subjected to the necessary vulcanizing temperature, preferably in a dry heat oven, and the end closure members are then applied to the container body with the margins of the unvulcanized lining 8 pressed against the unvulcanized bead coverings. One or both of the contacting unvulcanized rubber parts may be moistened or softened with a rubber solvent such as gasoline, to secure a more intimate union.

After the heads have been applied they may be secured in any suitable manner, as for example by rolling together the flanges $1^b$ and $2^b$.

Having thus described my invention, what I claim is:—

1. The hereindescribed method of making portable acid-proof containers, which consists in providing a cylindrical body having internal annular shoulders adjacent each end, and a pair of closure heads, applying to the interior of the body a layer of vulcanizable rubber, rolling the edges of the vulcanizable layer to form beads overlying the said shoulders, applying to the exposed face of said vulcanizable rubber a sheet of unvulcanizable rubber with its edges overlying said beads, applying to the heads layers of respectively vulcanizable and unvulcanizable rubber with the unvulcanized layer exposed, subjecting the body and heads to vulcanizing temperature, and thereafter securing the heads to the body with the unvulcanized layers thereof pressed against the beads.

2. The method of claim 1, in which the body and heads are first coated with rubber cement which is cured before application of the vulcanizable layer.

3. The method of claim 1, in which the body and heads are lined with two layers of rubber compound before application of the unvulcanizable layer, which two layers are adapted respectively to be wholly and partially cured.

4. The process of claim 1, in which the unvulcanized covering of the beads is softened by rubber solvent prior to application of the heads.

In testimony whereof, I affix my signature.

RAYMOND M. WARNER.